(12) United States Patent
Heap et al.

(10) Patent No.: US 7,730,984 B2
(45) Date of Patent: Jun. 8, 2010

(54) METHOD AND APPARATUS FOR CONTROL OF A HYBRID ELECTRIC VEHICLE TO ACHIEVE A TARGET LIFE OBJECTIVE FOR AN ENERGY STORAGE DEVICE

(75) Inventors: Anthony H. Heap, Ann Arbor, MI (US); Andrew M. Zettel, Ann Arbor, MI (US); William R. Cawthorne, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 806 days.

(21) Appl. No.: 11/422,709

(22) Filed: Jun. 7, 2006

(65) Prior Publication Data

US 2007/0284163 A1 Dec. 13, 2007

(51) Int. Cl.
*B60W 20/00* (2006.01)

(52) U.S. Cl. .............................. 180/65.29; 180/65.285; 702/53

(58) Field of Classification Search .............. 180/65.29, 180/65.285, 65.265; 702/63
See application file for complete search history.

(56) References Cited

U.S. PATENT DOCUMENTS

| | | | |
|---|---|---|---|
| 5,230,074 A | 7/1993 | Canova, Jr. et al. | |
| 5,998,960 A * | 12/1999 | Yamada et al. ............... | 320/104 |
| 6,137,250 A * | 10/2000 | Hirano et al. ................ | 318/376 |
| 6,191,556 B1 * | 2/2001 | Galbraith et al. ............. | 320/132 |
| 6,317,697 B1 * | 11/2001 | Yoshikawa et al. ............ | 702/63 |
| 6,487,477 B1 * | 11/2002 | Woestman et al. ............. | 701/22 |
| 6,504,259 B1 * | 1/2003 | Kuroda et al. .............. | 290/40 C |
| 6,845,332 B2 * | 1/2005 | Teruo .......................... | 702/63 |
| 7,078,877 B2 * | 7/2006 | Salasoo et al. .............. | 320/104 |
| 7,136,762 B2 * | 11/2006 | Ono ............................ | 702/63 |
| 2002/0161537 A1 * | 10/2002 | Odaohhara .................... | 702/63 |
| 2003/0034779 A1 * | 2/2003 | Juncker et al. .............. | 324/426 |
| 2003/0184307 A1 * | 10/2003 | Kozlowski et al. .......... | 324/427 |
| 2005/0040789 A1 | 2/2005 | Salasoo et al. | |
| 2006/0232240 A1 | 10/2006 | Salasoo et al. | |
| 2007/0284163 A1 * | 12/2007 | Heap et al. .................. | 180/65.2 |
| 2008/0249745 A1 * | 10/2008 | Heap et al. .................. | 702/183 |
| 2009/0088994 A1 * | 4/2009 | Machiyama et al. .......... | 702/63 |
| 2009/0099800 A1 * | 4/2009 | Ishishita ...................... | 702/63 |
| 2009/0112495 A1 * | 4/2009 | Center .......................... | 702/63 |

OTHER PUBLICATIONS http://www.m-w.com/dictionary/gradient, p. 1.
USPTO, Prosecution History for U.S. Appl. No. 11/422,673.

* cited by examiner

*Primary Examiner*—Jeffrey J Restifo

(57) ABSTRACT

A method for determining a preferred operating gradient for use in attaining a life objective for an electrical energy storage device in a hybrid vehicle is disclosed. A present state-of-life of the electrical energy storage device is provided and a life target for the electrical energy storage device is established as a predetermined limit in a predetermined metric at a predetermined state-of-life of the electrical energy storage device. A state-of-life gradient is then determined with respect to the predetermined metric which converges the state-of-life of the electrical energy storage device to the life target.

14 Claims, 6 Drawing Sheets

METHOD AND APPARATUS FOR CONTROL OF A HYBRID ELECTRIC VEHICLE TO ACHIEVE A TARGET LIFE OBJECTIVE FOR AN ENERGY STORAGE DEVICE

TECHNICAL FIELD

This invention pertains generally to management of an electrical energy storage device. More particularly, the invention is concerned with achieving a target life for an electrical energy storage device.

BACKGROUND OF THE INVENTION

Various hybrid propulsion systems for vehicles use electrical energy storage devices to supply electrical energy to electrical machines, which are operable to provide motive torque to the vehicle, often in conjunction with an internal combustion engine. One such hybrid powertrain architecture comprises a two-mode, compound-split, electro-mechanical transmission which utilizes an input member for receiving power from a prime mover power source and an output member for delivering power from the transmission to a vehicle driveline. First and second electric machines, i.e. motor/generators, are operatively connected to an energy storage device for interchanging electrical power therebetween. A control unit is provided for regulating the electrical power interchange between the energy storage device and the electric machines. The control unit also regulates electrical power interchange between the first and second electric machines.

One of the design considerations in vehicle powertrain systems is an ability to provide consistent vehicle performance and component/system service life. Hybrid vehicles, and more specifically the battery pack systems utilized therewith, provide vehicle system designers with new challenges and tradeoffs. It has been observed that service life of an electrical energy storage device, e.g. a battery pack system, increases as resting temperature of the battery pack decreases. However, cold operating temperature introduces limits in battery charge/discharge performance until temperature of the pack is increased. A warm battery pack is more able to supply required power to the vehicle propulsion system, but continued warm temperature operation may result in diminished service life.

Modern hybrid vehicle systems manage various aspects of operation of the hybrid system to effect improved service life of the battery. For example, depth of battery discharge is managed, amp-hour (A-h) throughput is limited, and convection fans are used to cool the battery pack. Ambient environmental conditions in which the vehicle is operated has largely been ignored. However, the ambient environmental conditions may have significant effect upon battery service life. Specifically, same models of hybrid vehicles released into various geographic areas throughout North America would likely not result in the same battery pack life, even if all the vehicles were driven on the same cycle. The vehicle's environment must be considered if a useful estimation of battery life is to be derived. Additionally, customer expectations, competition and government regulations impose standards of performance, including for service life of battery packs, which must be met.

End of service life of a battery pack may be indicated by ohmic resistance of the battery pack. The ohmic resistance of the battery pack is typically flat during much of the service life of the vehicle and battery pack however, thus preventing a reliable estimate of real-time state-of-life ('SOL') of the battery pack throughout most of the service life. Instead, ohmic resistance is most useful to indicate incipient end of service life of the battery pack.

It is desirable to have a method and apparatus to provide a control of operation of an electrical energy storage system, including for application on a gasoline/electric hybrid vehicle that controls operation based upon a targeted service life of the electrical energy storage device.

SUMMARY OF THE INVENTION

A hybrid vehicular powertrain includes first and second electric machines, each machine operable to impart torque to a two-mode, compound-split electro-mechanical transmission having four fixed gear ratios and two continuously variable operating modes. A method for operating the hybrid electric powertrain includes providing present state-of-life of the electrical energy storage device and establishing a life target for the electrical energy storage device as a predetermined limit in a predetermined metric at a predetermined state-of-life of the electrical energy storage device. A state-of-life gradient is then determined with respect to the predetermined metric which converges the state-of-life of the electrical energy storage device to the life target. The electric machines are operated such that electrical energy storage device state-of-life substantially tracks the state-of-life gradient based on the determined changes in state-of-life.

Preferably, the predetermined state-of-life of the electrical energy storage device is indicative of the end of life of the electrical energy storage device. In accordance with one alternative, the metric includes elapsed service time of the electrical energy storage device. In accordance with another alternative, the metric comprises vehicle distance traveled. In accordance with another alternative, the life target is based upon a predetermined limit in one of elapsed service time of the electrical energy storage device and vehicle distance traveled. The life target is preferably normalized with respect to the one of elapsed service time of the electrical energy storage device and vehicle distance traveled upon which the life target is based.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
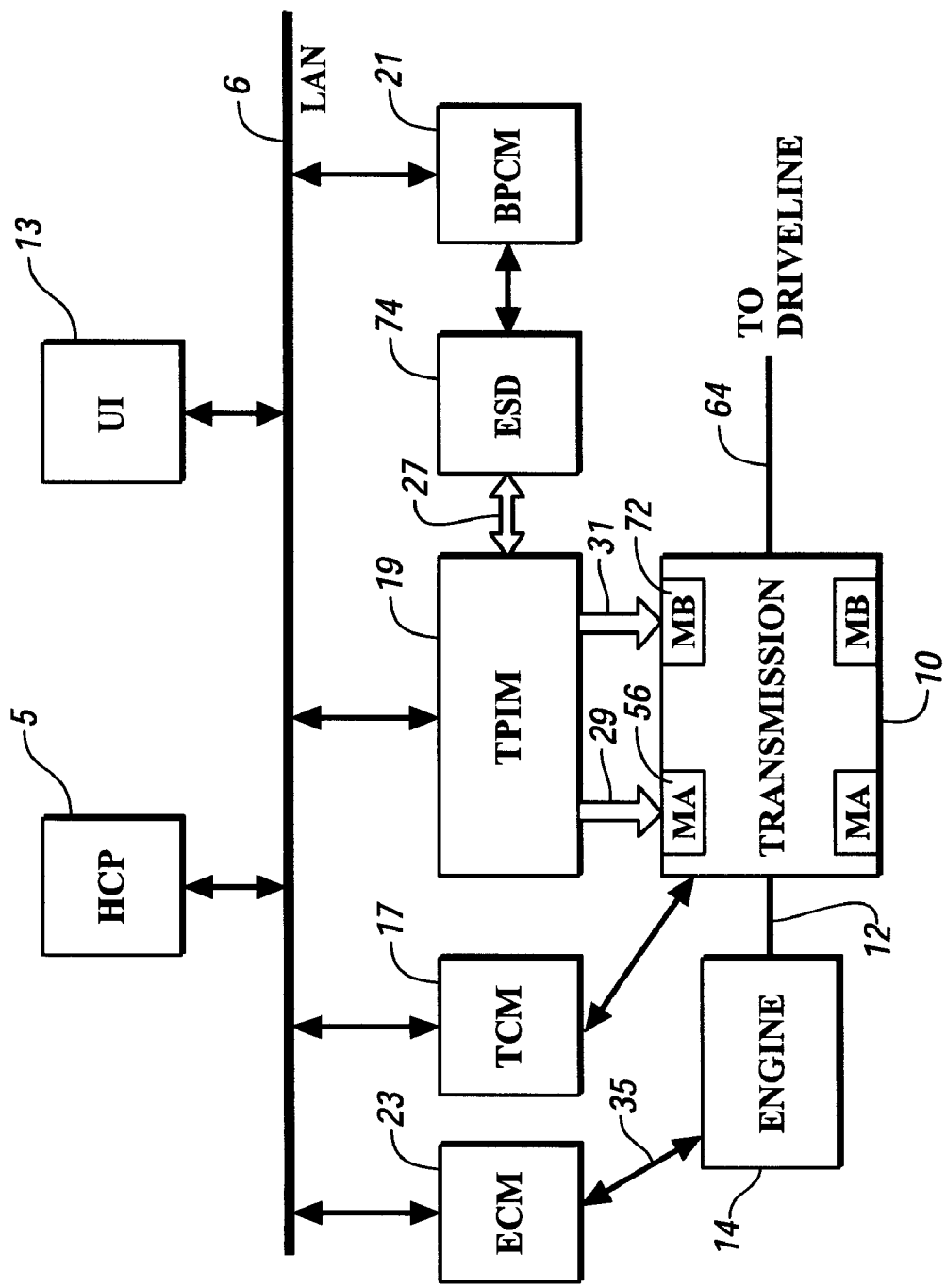
FIG. 1 is a schematic diagram of an exemplary architecture for a control system and powertrain, in accordance with the present invention; and, FIGS. 2 and 3 are algorithmic block diagrams, in accordance with the present invention.

Referring now to the drawings, wherein the showings are for the purpose of illustrating the invention only and not for the purpose of limiting the same, FIG. 1 shows a control system and an exemplary hybrid powertrain system which has been constructed in accordance with an embodiment of the invention. The exemplary hybrid powertrain system comprises a plurality of torque-generative devices operable to supply motive torque to a transmission device, which supplies motive torque to a driveline. The torque-generative devices preferably comprise an internal combustion engine 14 and first and second electric machines 56, 72 operable to convert electrical energy supplied from an electrical storage device 74 to motive torque. The exemplary transmission device 10 comprises a two-mode, compound-split electro-mechanical transmission having four fixed gear ratios, and includes a plurality of gears operable to transmit the motive torque to an output shaft 64 and driveline through a plurality of torque-transfer devices contained therein. Mechanical aspects of exemplary transmission 10 are disclosed in detail in U.S. Pat. No. 6,953,409, entitled "Two-Mode, Compound-Split, Hybrid Electro-Mechanical Transmission having Four Fixed Ratios", which is incorporated herein by reference.

The control system comprises a distributed control module architecture interacting via a local area communications network to provide ongoing control to the powertrain system, including the engine 14, the electrical machines 56, 72, and the transmission 10.

The exemplary powertrain system been constructed in accordance with an embodiment of the present invention. The hybrid transmission 10 receives input torque from torque-generative devices, including the engine 14 and the electrical machines 56, 72, as a result of energy conversion from fuel or electrical potential stored in electrical energy storage device (ESD) 74. The ESD 74 typically comprises one or more batteries. Other electrical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and, propulsion requirements such as emissions, power assist and electric range. The ESD 74 is high voltage DC-coupled to transmission power inverter module (TPIM) 19 via DC lines referred to as transfer conductor 27. The TPIM 19 transfers electrical energy to the first electrical machine 56 by transfer conductors 29, and the TPIM 19 similarly transfer electrical energy to the second electrical machine 72 by transfer conductors 31. Electrical current is transferable between the electrical machines 56, 72 and the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

The electrical machines 56, 72 preferably comprise known motors/generator devices. In motoring control, the respective inverter receives current from the ESD and provides AC current to the respective motor over transfer conductors 29 and 31. In regeneration control, the respective inverter receives AC current from the motor over the respective transfer conductor and provides current to the DC lines 27. The net DC current provided to or from the inverters determines the charge or discharge operating mode of the electrical energy storage device 74. Preferably, machine A 56 and machine B 72 are three-phase AC electrical machines and the inverters comprise complementary three-phase power electronic devices.

The elements shown in FIG. 1, and described hereinafter, comprise a subset of an overall vehicle control architecture, and are operable to provide coordinated system control of the powertrain system described herein. The control system is operable to gather and synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed control module architecture of the control system comprises an engine control module ('ECM') 23, transmission control module ('TCM') 17, battery pack control module ('BPCM') 21, and the Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Within the control system, each of the aforementioned control modules communicates with other control modules, sensors, and actuators via a local area network ('LAN') communications bus 6. The LAN bus 6 allows for structured communication of control parameters and commands between the various control modules. The specific communication protocol utilized is application-specific. By way of example, one communications protocol is the Society of Automotive Engineers standard J1939. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command; clutch torque commands for various clutches of the hybrid transmission 10; and motor torque commands for the electrical machines A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates an axle torque request. For simplicity, ECM 23 is shown generally having bi-directional interface with engine 14 via aggregate line 35. Various parameters that are sensed by ECM 23 include engine coolant temperature, engine input speed to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command control signals, i.e. clutch torque commands to the clutches of the transmission.

The BPCM 21 interacts with various sensors associated with the ESD 74 to derive information about the state of the ESD 74 to the HCP 5. Such sensors comprise voltage and electrical current sensors, as well as ambient sensors operable to measure operating conditions of the ESD 74 including, e.g., temperature and internal resistance of the ESD 74. Sensed parameters include ESD voltage, $V_{BAT}$, ESD current, $I_{BAT}$, and ESD temperature, $T_{BAT}$. Derived parameters preferably include, ESD internal resistance, $R_{BAT}$, ESD state-of-charge, SOC, and other states of the ESD, including available electrical power, $P_{BAT\_MIN}$ and $P_{BAT\_MAX}$.

The Transmission Power Inverter Module (TPIM) 19 includes the aforementioned power inverters and machine control modules configured to receive motor control commands and control inverter states therefrom to provide motor drive or regeneration functionality. The TPIM 19 is operable to generate torque commands for machines A and B based upon input from the HCP 5, which is driven by operator input through UI 13 and system operating parameters. Motor torques are implemented by the control system, including the TPIM 19, to control the machines A and B. Individual motor speed signals are derived by the TPIM 19 from the motor phase information or conventional rotation sensors. The TPIM 19 determines and communicates motor speeds to the HCP 5.

Each of the aforementioned control modules of the control system is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The action described hereinafter occurs during active operation of the vehicle, i.e. that period of time when operation of the engine and electrical machines are enabled by the vehicle operator, typically through a 'key-on' action. Quiescent periods include periods of time when operation of the engine and electrical machines are disabled by the vehicle operator, typically through a 'key-off' action. In response to an operator's action, as captured by the UI 13, the supervisory HCP control module 5 and one or more of the other control modules determine required transmission output torque, $T_o$. Selectively operated components of the hybrid transmission 10 are appropriately controlled and manipulated to respond to the operator demand. For example, in the exemplary embodiment shown in FIG. 1, when the operator has selected a forward drive range and manipulates either the accelerator pedal or the brake pedal, the HCP 5 determines how and when the vehicle is to accelerate or decelerate. The HCP 5 also monitors the parametric states of the torque-generative devices, and determines the output of the transmission required to effect a desired rate of acceleration or deceleration. Under the direction of the HCP 5, the transmission 10 operates over a range of output speeds from slow to fast in order to meet the operator demand.

Figure 2:
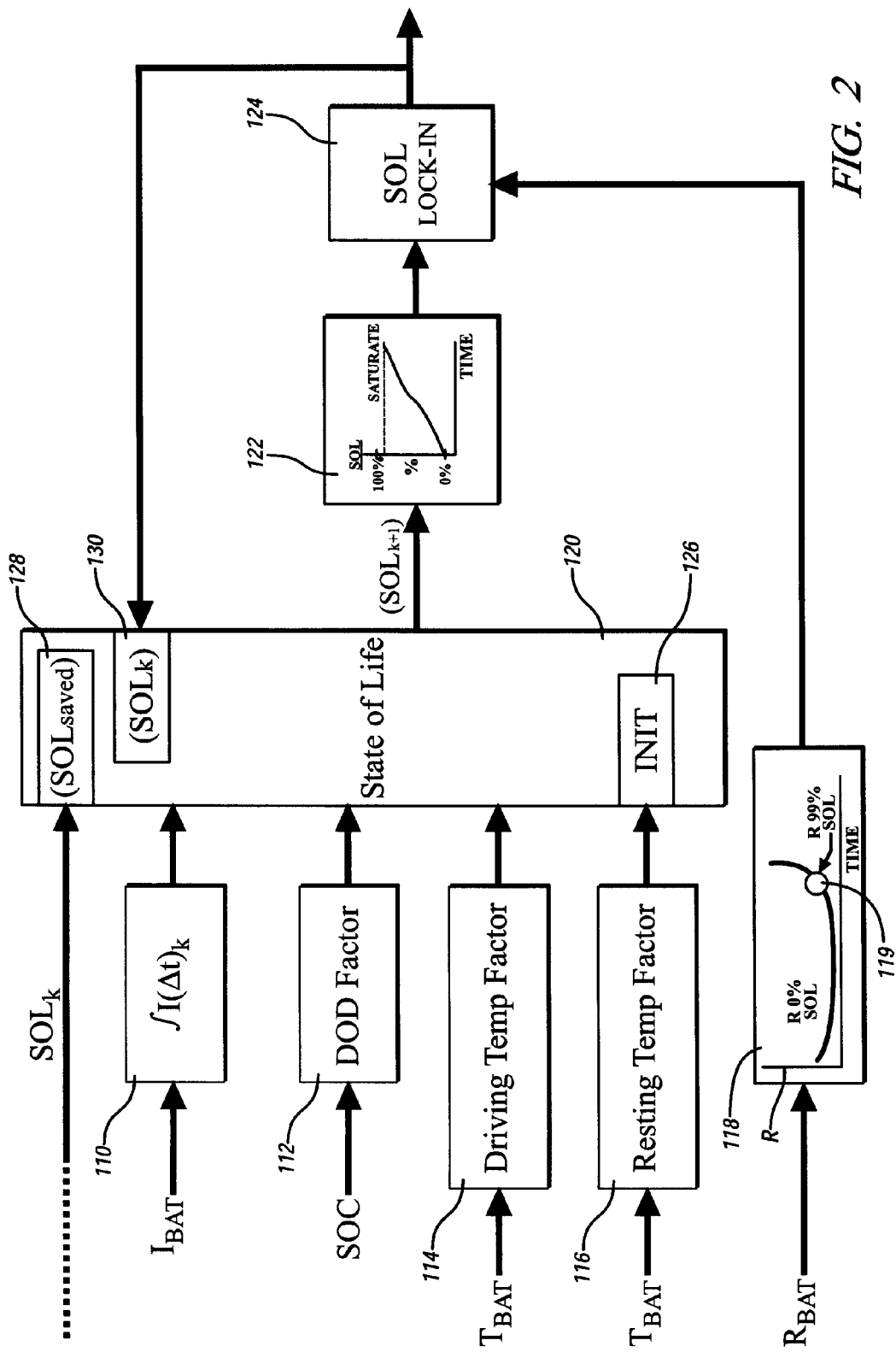

Referring now to FIG. 2, a method and apparatus to estimate a state-of-life ('SOL') of an energy storage device useable in a hybrid control system in real-time is described. The exemplary method and apparatus to estimate state-of-life ('SOL') of the energy storage device in the hybrid control system in real-time is disclosed in detail in U.S. patent application Ser. No. 11/422,691, now U.S. Pat. No. 7,550,946, which is incorporated herein by reference. The exemplary method and apparatus to estimate state-of-life comprises an algorithm that monitors an electrical current and a state-of-charge and temperature of the electrical energy storage device 74 during operation. Temperature of the electrical energy storage device 74 is further monitored during quiescent periods of ESD operation. Quiescent periods of ESD operation are characterized by ESD power flow that is de minimus whereas active periods of ESD operation are characterized by ESD power flow that is not de minimus. That is to say, quiescent periods of ESD operation are generally characterized by no or minimal current flow into or out of the ESD. With respect to an ESD associated with a hybrid vehicle propulsion system for example, quiescent periods of ESD operation may be associated with periods of vehicle inactivity (e.g. powertrain, including electric machines, is inoperative such as during periods when the vehicle is not being driven and accessory loads are off but may include such periods characterized by parasitic current draws as are required for continuing certain controller operations including, for example, the operations associated with the present invention). Active periods of ESD operation in contrast may be associated with periods of vehicle activity (e.g. accessory loads are on and/or the powertrain, including electric machines, is operative such as during periods when the vehicle is being driven wherein current flows may be into or out of the ESD). The state-of-life ('SOL') of the electrical energy storage device 74 is determined based upon the ESD current, the state-of-charge of the ESD, and the temperature of the ESD during quiescent and active periods of operation. The inputs to calculation of SOL, include ESD internal resistance $R_{BAT}$, ESD temperature $T_{BAT}$, ESD state-of-charge SOC, and ESD current $I_{BAT}$. These are known operating parameters measured or derived within the distributed control system. From these parameters, an A-h integration factor 110, a depth of discharge ('DOD') factor 112, a driving temperature factor, $T_{DRIVE}$, 114 and a resting temperature factor, $T_{REST}$, 116 are determined, and provided as input to determine a parameter for SOL. The operating parameters used to calculate SOL include: ESD current, $I_{BAT}$, which is monitored in real-time, measured in amperes, and integrated as a function of time; magnitude of electrical current flowing through the ESD 74 during each active charging and discharging event; ESD state-of-charge ('SOC'), including depth-of-discharge ('DOD'); ESD temperature factor during active periods of operation, $T_{DRIVE}$, and ESD temperature factor during inactive periods of operation, $T_{REST}$.

Referring again to FIG. 2, a schematic diagram is shown, demonstrating an exemplary method for estimating the state-of-life of the ESD 74 in real-time, based upon monitored inputs. The method is preferably executed as one or more algorithms in one of the controllers of the control system, typically the HCP 5. The estimated state-of-life of the ESD 74 ('$SOL_K$') is preferably stored as a scalar value in a non-volatile memory location for reference, updating, and for resetting, each occurring at appropriate points during life of the vehicle and the ESD 74. Overall, determining a parametric value for the SOL comprises monitoring in real-time an ESD current $I_{BAT}$ (in amperes), an ESD temperature $T_{BAT}$, an ESD voltage $V_{BAT}$, an ESD resistance $R_{BAT}$, and a ESD state-of-charge ('SOC'). Each of the aforementioned factors, i.e. the integrated ESD current, depth of discharge, driving temperature factor, and resting temperature factor, are combined, preferably by a summing operation, with a previously determined state-of-life factor, $SOL_K$, to determine a parametric value for the SOL, i.e. $SOL_{K+1}$, shown as an output to block 120. The algorithm to determine the state-of-life factor, $SOL_{K+1}$, is preferably executed multiple times during each trip. When the engine/vehicle is initially started or turned on, there is an initial state-of-life factor, $SOL_K$, which is used in calculating subsequent values for SOL, and is shown as $SOL_{SAVED}$ 128. The $SOL_{SAVED}$ factor 128 is only used once during each trip, and is supplanted in future calculations during the trip the $SOL_{K+1}$ factor output from Blocks 120, 122, and 124, which is shown as Block 130. Similarly, the resting temperature factor output from Block 116 is only used during the first execution of the algorithm to calculate SOL after the engine/vehicle is initially started or turned on, as is indicated by the INIT block 126. On subsequent executions of the algorithm to calculate SOL, the resting temperature factor is omitted from the calculation of SOL.

Figure 3:
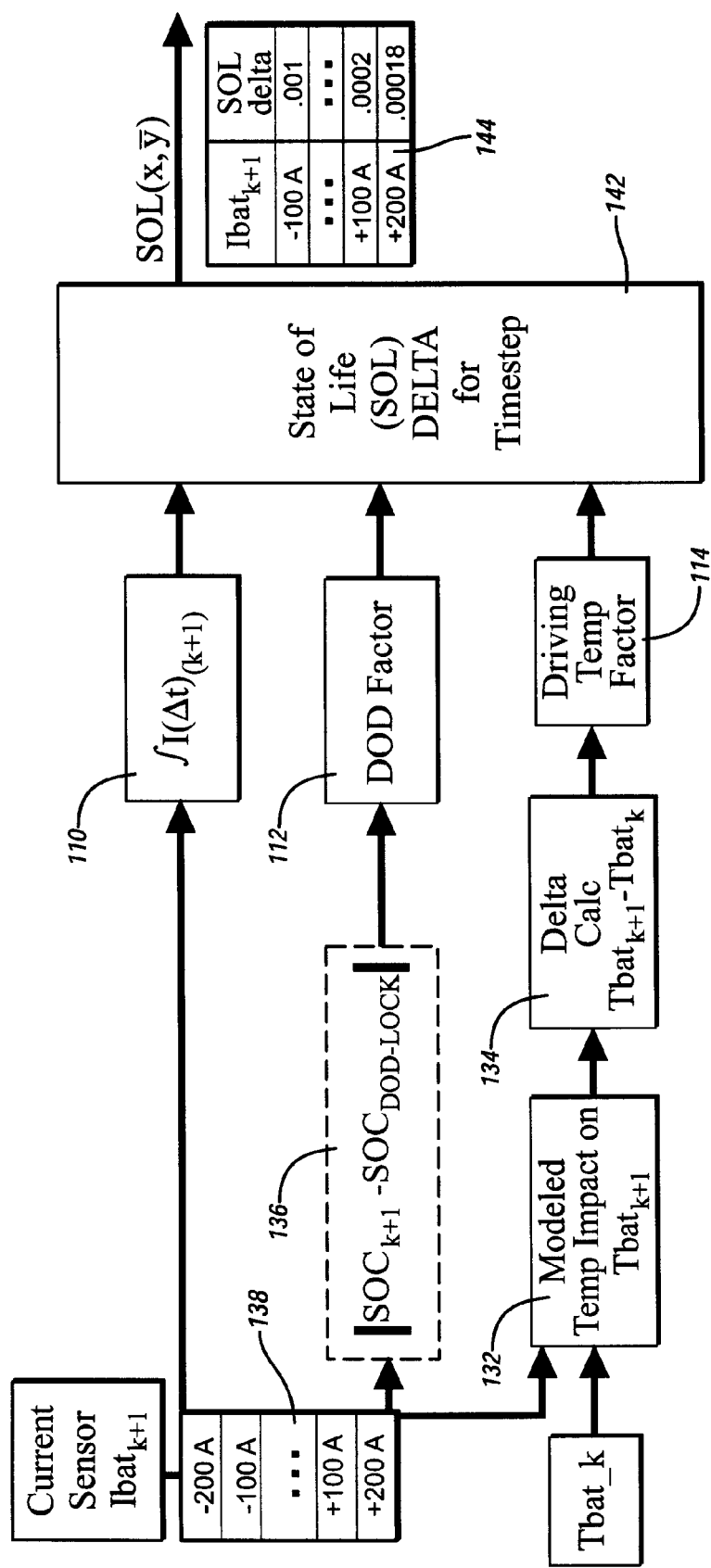

Referring now to FIG. 3, a method and apparatus to predict or estimate a plurality of future or potential life gradients of a state-of-life parameter of an energy storage device useable in a hybrid control system in real-time is described. The exemplary method and apparatus to estimate the plurality of future life gradients of the state-of-life ('SOL') of the energy storage device in the hybrid control system in real-time is disclosed in detail in U.S. patent application Ser. No. 11/422,700, now U.S. Patent Application Number 2007/0284162 A1. Therein is described a method and apparatus for calculating, a priori, a range of effects on state-of-life of an electrical energy storage device for a hybrid vehicle. The method includes determining potential changes in an operating state for the electrical energy storage device. This includes selecting an array of potential values for an operating parameter e.g. electrical current, over a continuum from a maximum charging current to a maximum discharging current, from which is determined or predicted a corresponding array of effects or changes upon operating state values, e.g. effects upon state-of-life. Each predicted change in the operating state is determined based upon and corresponding to one of the array of values for the operating parameter of the electrical energy storage device. The predicted change in the state-of-life is based upon: time-based integration of the electrical current, depth of discharge of the energy storage device, and, operating temperature of the electrical energy storage device, which are determined for each of the array of potential values for electrical current.

Figure 4:
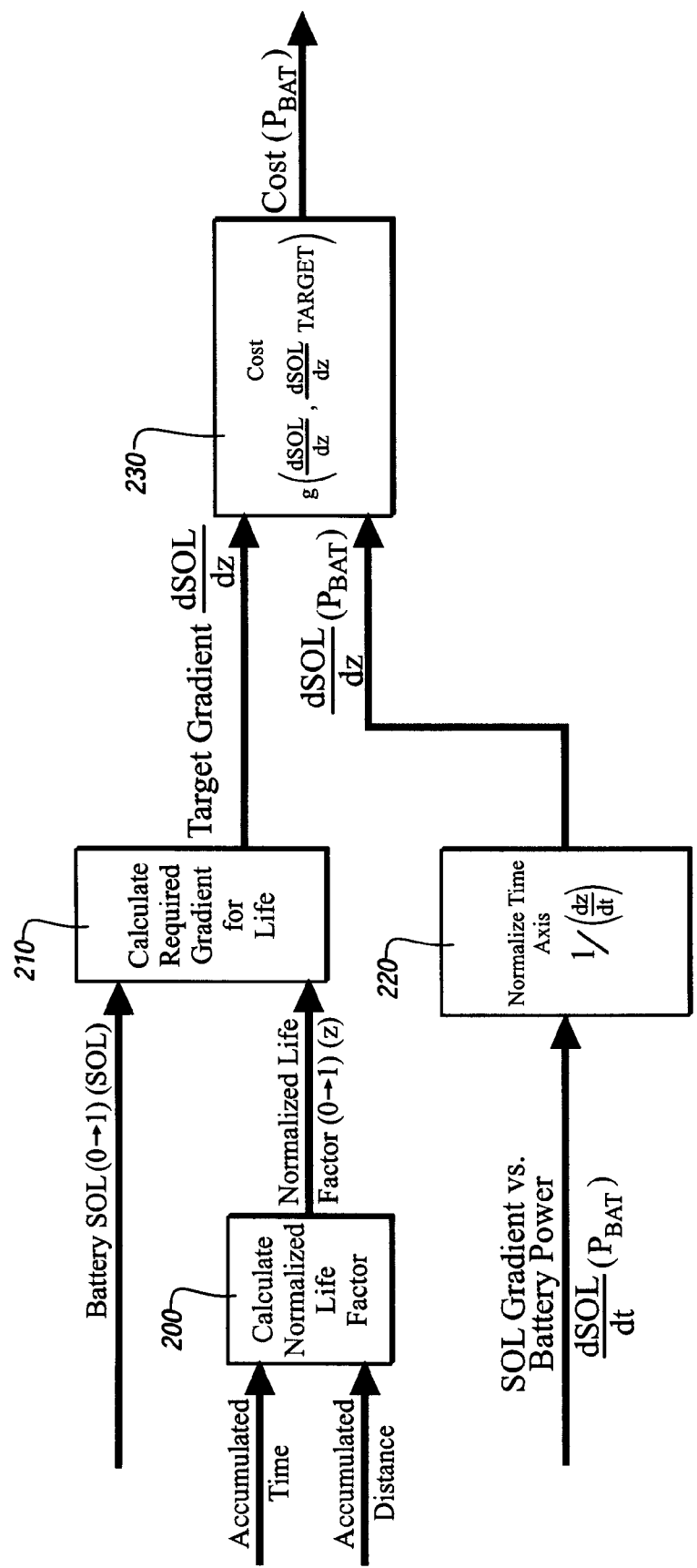
FIG. 4 is a logic flowchart, in accordance with the present invention.

Referring now to FIG. 4, a control algorithm for hybrid vehicle operation which targets a life objective for the electrical energy storage device 74 is now described. The algorithm is preferably executed in the aforementioned control system of the hybrid vehicle, preferably during one of the loop cycles, to effect real-time control and adjustments to the operation of the powertrain based upon prior use of the hybrid vehicle and the ESD 74. A primary control objective of the algorithm comprises controlling operation of the electrical machines 56, 72, including motive torque outputs, in charging and discharging, to manage life of the ESD 74.

In the exemplary system, ESD power, $P_{BAT}$, as a parameter that affects service life of the energy storage system 74, and is controllable by the hybrid control system. ESD power, $P_{BAT}=I_{BAT}^2/R_{BAT}$. A relationship between the parametric value for ESD power, $P_{BAT}$ and a target life objective for the ESD is established. This permits generation of a control algorithm which is operative to ongoingly and regularly control electrical power exchanged between ESD 74 to the electrical motors 56, 72 such that the operating state, e.g. state-of-life (SOL), of the ESD is less than a predetermined value when the target life objective for the ESD is attained. The control algorithm is preferably executed by the control system during one of the previously described preset loop cycles. This algorithm is described in detail hereinbelow.

Referring again to FIG. 4, in overall operation, the algorithm uses as input parameters a normalized value for state-of-life (SOL) of the ESD, a time-based state-of-life gradient based upon ESD power, an accumulated elapsed time in service, and an accumulated distance. A normalized life factor is calculated based upon the accumulated time, and accumulated distance (Block 200). The normalized life factor, output from block 200, and the normalized value for state-of-life are used to calculate a required, desired or target gradient for life (Block 210). The time-based state-of-life gradient based upon ESD power is normalized along the time axis (Block 220). The required gradient for life, output from block 210 and the normalized state-of-life gradient based upon ESD power output from block 220, both converted to a z-domain, comprising a normalized domain ranging from 0.0 to 1.0, are input to a cost function (block 230) which generates an output of cost associated with ESD power, $P_{BAT}$.

The preferred operating state, i.e. the state-of-life (SOL) parameter described hereinabove, is normalized as follows:

SOL=0, for a new unused ESD, e.g. at start of service life; and,

SOL=1, for a fully expended ESD, e.g. at an end of service life ('EOL').

The normalized life factor output (in the z-domain) from Block 200 is determined as follows. The energy storage system has a target life objective defined in terms of time and/or distance. For example, a hybrid vehicle might specify a target life objective in terms of time of 8 years and a target life objective in terms of distance of 160,000 kilometers (100,000 miles). In this example, an exemplary ESD which remains in service for eight years or 160,000 kilometers (100,000 miles) of operation has met the target life objective.

The accumulated time, also referred to as a Total ESD Time, is defined as the total cumulative time that the energy storage system has been in service, including all periods of vehicle activity and inactivity and all active and quiescent periods of ESD operation. In this embodiment, the ECM preferably includes a timing device which is able to measure and record elapsed operation time, including time when the vehicle ignition is off and the system powered down. Under a circumstance wherein a particular ESD is replaced with a new ESD, the accumulated time value is reset to zero. Under a circumstance wherein a particular ESD is replaced with a partially expended or used ESD, the accumulated time is reset to an estimated total cumulative time that the partially expended ESD had previously been in service. A normalized time life parameter is defined, using the same time units, as:

$$\text{Normalized Time Life Parameter} = \frac{\text{Total } ESD \text{ Time}}{ESD \text{ Time Life Target}}$$

The ESD target life objective for time is 8 years for the exemplary system being described.

The accumulated distance, also referred to as a Total ESD Distance, is defined as a total cumulative distance of operation with the ESD, which is measurable in the ECM or other controller of the distributed control architecture. Under a circumstance wherein a particular ESD is replaced with a new system, the accumulated distance is reset to zero. Under a circumstance wherein a particular ESD is replaced with a partially expended or used ESD, the accumulated distance can be reset to an estimated total cumulative distance that the expended or used ESD previously experienced. A normalized distance life parameter is defined, using the same distance units, as the following:

$$\text{Normalized Distance Life Parameter} = \frac{\text{Total ESD Distance}}{\text{ESD Distance Life Target}}$$

The ESD target life objective for distance is 160,000 kilometers (100,000 miles) for the exemplary system being described.

Determining the Normalized Life Factor (in z-domain), output from block 200, comprises capturing parametric values for accumulated time, i.e. Total ESD Time, and accumulated distance, i.e. Total ESD Distance, and normalizing them as described herein above and wherein z=0 at the Start of Life Cycle of the ESD, i.e. when the timer for accumulated time and the distance monitor for accumulated distance each begin counting; and, z=1 at the ESD target life objective, or Targeted End of Life ('EOL').

A preferred method for calculating the Normalized Life Parameter comprises selecting a maximum value between the Normalized Time Life Parameter and the Normalized Distance Life Parameter, shown below:

Normalized Life Parameter=MAXIMUM(Normalized Time Life Parameter, Normalized Distance Life Parameter)

In the exemplary embodiment, wherein ESD Time Life Target is 8 years and the ESD Distance Life Target is 160,000 kilometers (100,000 miles), a linear budget of substantially 20,000 kilometers (12,500 miles) per year of service is assumed. The Normalized Life Parameter could simply be defined as follows, in Table 1:

TABLE 1

| Total ESD Time | Total ESD Distance | Dominating Factor (Time or Distance) | Normalized Life Parameter (z) |
|---|---|---|---|
| 4 years | 32,000 km (20,000 miles) | Time | 0.50 |
| 2 years | 80,000 km (50,000 miles) | Distance | 0.50 |
| 4 years | 80,000 km (50,000 miles) | Both | 0.50 |
| 9 years | 112,000 km (70,000 miles) | Time | 1.00 = Target EOL |
| 5 years | 160,000 km (100,000 miles) | Distance | 1.00 = Target EOL |

Although the preferred embodiment of this invention involves the use of time and/or distance in defining the definition of targeted end of life ('EOL'), other parameters can be used.

The time domain parameters are converted to normalized life parameters, in the z-domain. It is desirable to be able to convert a differential amount of run time (in dt) to a differential amount of Normalized Life Parameter (in dz), for ease of comparisons.

The percent of time the vehicle is operated, i.e. Total Vehicle Run Time, is compared to total in-service time of the vehicle, i.e. Total Vehicle Time, to estimate a percent of vehicle run time versus total vehicle time. Total vehicle time ideally has the same value as Total ESD Time. The Total Vehicle Run Time Percentage is defined as follows:

$$\text{Total Vehicle Run Time Percentage} = \frac{\text{Total Vehicle Run Time}}{\text{Total Vehicle Time}}$$

In the exemplary embodiment, a vehicle that is determined to be operating or running for 5% of total time (Total Vehicle Run Time Percentage=5%), the following analysis is shown with reference to Table 2, below:

TABLE 2

| Total ESD Time | Total ESD Distance | Dominating Factor | Normalized Life Parameter (z) | Total ESD Time to EOL | Total ESD Run Time to EOL |
|---|---|---|---|---|---|
| 4 years | 20,000 miles | Time | 0.50 | 4 years / 0.5 = 8 years | 8 × 0.05 = 0.40 years |
| 2 years | 50,000 miles | Distance | 0.50 | 2 years / 0.5 = 4 years | 4 × 0.05 = 0.20 years |

Referring again to Table 2, examples are provided to explain system operation. Exemplary values for two vehicles are shown, wherein Total ESD Time and Total ESD Distance are known. One of ESD Time and Distance is determined to be a dominating factor based upon whether the exemplary vehicle is likely to attain a target life objective of time or distance, as determinable based upon the Normalized Life Parameter. When the dominating factor is time, then the Total ESD Time to EOL equals the Target Total ESD Time. When the dominating factor is Distance, then Total ESD Time to EOL equals is determined based upon Distance, and is less than the ESD Target time life objective.

When a new ESD is installed, thus setting z=0, Total ESD Run Time to EOL is the following:

Total ESD Run Time to EOL=Total Vehicle Run Time %×ESD Time Life Target

After the ESD has been used (z>0), the Total ESD Run Time to End of life ('EOL') is $$\text{Total ESD Run Time to } EOL = \text{Total Vehicle Run Time \%} \times \left( \frac{\text{Total } ESD \text{ Time}}{\text{Normalized Life Parameter } (z)} \right)$$

The Total ESD Run Time to EOL effectively converts differential changes in run time (dt) to differential changes in the Normalized Life Parameter (dz), i.e., $$dz = \frac{dt \text{ (sec)}}{\text{Total } ESD \text{ Run Time } EOL \text{ (sec)}}$$

The state-of-life gradient (dSOL/dt) estimated as a function of electrical current and ESD power ($P_{BAT}$), is described hereinabove, and comprises estimating ESD state-of-life time gradient as a function of ESD Power for an array of preselected current levels.

Referring again to FIG. 4, it is relatively straightforward to normalize time and transform a time gradient to a normalized gradient (notated as dSOL/dz). By example, when the targeted ESD life objective is defined as a run time, in seconds of Total ESD Run Time to EOL, the normalized state-of-life gradient is defined as follows:

$$\frac{dSOL}{dz} = \frac{dSOL}{dt}\left[\frac{1}{\sec}\right] \times \text{Total } ESD \text{ Run Time to } EOL \text{ [sec]}$$

Note that normalized gradient is defined in such a way that if the energy storage system averages a normalized gradient of one (1) or less, then the life objective is met. Similarly, if the normalized gradient averages greater than one, then the life objective is not met.

This provides a way of coupling the target objective to a key control variable gradient. A control system must be designed to control ESD power in such a way that at the end of the energy storage system life target (z=1), the SOL is less than 1. That is, over the life of the energy storage system (from z=0 to z=1), the average, and since normalized, the integral of dSOL/dz must be less than or equal to 1 for life objectives to be met. More particularly, as shown in Eq. 1, which is executable as an algorithm in the control system:

$P_{BAT}$ such that $$SOL(1) = \int_0^1 \frac{dSOL}{dz}(P_{BAT})dz \le 1 \quad [1]$$

Figure 5:
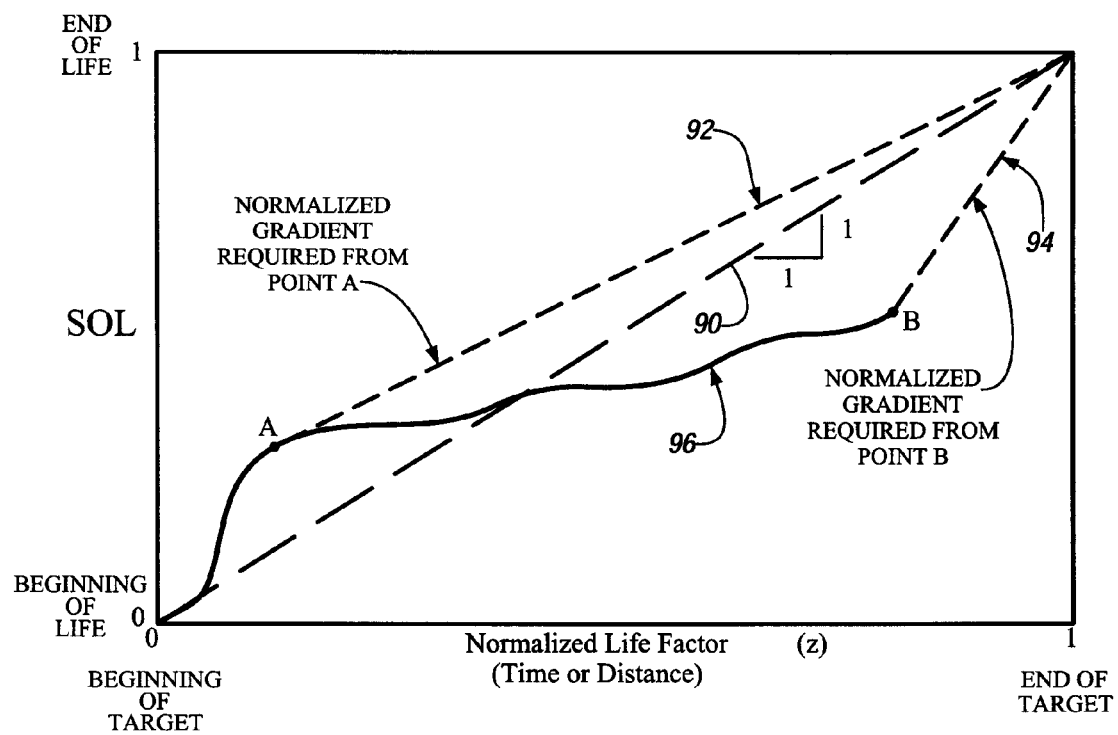
FIGS. 5 and 6 comprise analytical datagraphs, in accordance with the present invention.

Referring now to FIG. 5, a datagraph showing performance of an exemplary system with an ESD operating using the system described herein, wherein the x-axis comprises the normalized life factor of time or distance, converted to the z-domain, and the y-axis comprises the state-of-life (SOL). Line 90 comprises a representative system wherein a change in the state-of-life of the ESD increases linearly with a change in the normalized life factor in the z-domain, such that end of life criteria are just met. Line 96 shows an actual system, having exemplary Points A and B. Point A represents a system wherein ambient conditions or operation of the system led to aggressive use of the ESD, and thus to advanced aging of the ESD or high SOL of the ESD, such that it is possible that the ESD may be expended before the target service life. A first line 92 comprises a normalized target gradient line for Point A, calculated from Point A to the end of life of the device which comprises the SOL meeting the normalized life factor. In the condition wherein the system has reached an operating condition shown as point A, the control system estimates the array of parametric values for future SOL based upon the array of ESD current levels, $I_{BAT}$. The system is operable to match a parametric value for $P_{BAT}$ and corresponding value for $I_{BAT}$ that accomplishes the normalized gradient, using the algorithm developed in Eq. 1, above. This likely leads to less aggressive use of the ESD during vehicle operation.

Point B represents a system wherein ambient conditions or operation of the system led to less aggressive use of the ESD, thus leading to retarded aging of the ESD or low SOL of the ESD, such that it is possible that the ESD will not be expended upon reaching the target service life. A second line 94 comprises a normalized target gradient line for Point B, calculated from Point B to the end of life of the device which comprises the SOL meeting the normalized life factor. In the condition wherein the system has reached an operating condition shown as point B, the control system estimates the array of parametric values for future SOL based upon the array of ESD current levels, $I_{BAT}$. The system is operable to match a parametric value for $P_{BAT}$ and corresponding value for $I_{BAT}$ that accomplishes the normalized gradient, using the algorithm developed in Eq. 1, above. This likely leads to more aggressive use of the ESD during vehicle operation.

Figure 6A:
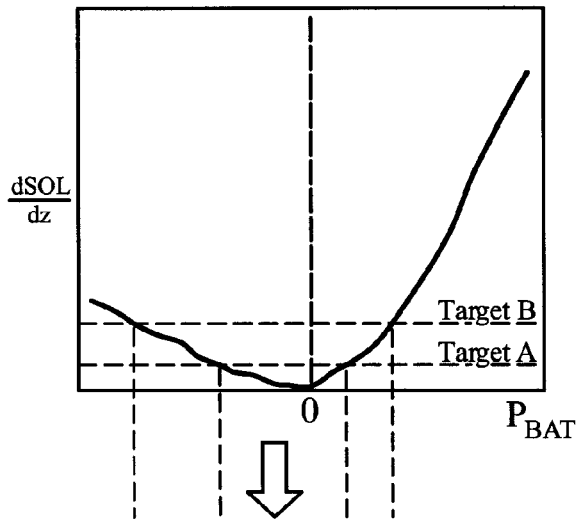
Figure 6B:
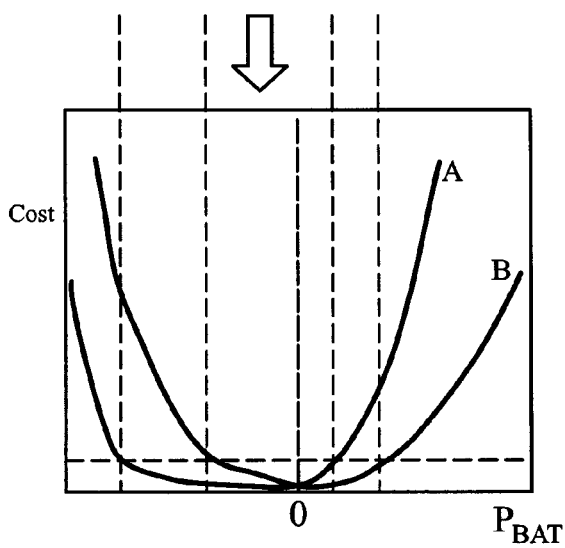
Figure 6C:
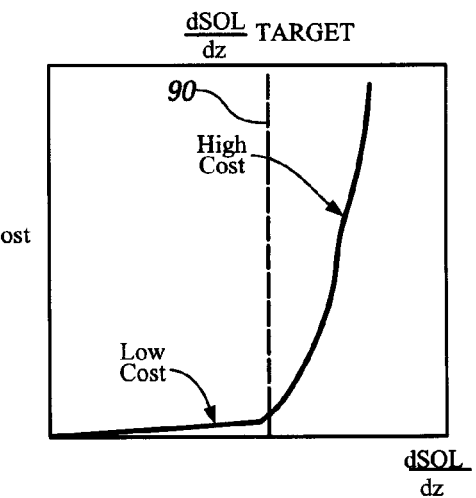

Referring now to FIGS. 6A, 6B, and 6C, further details of the operation of the system are provided. FIG. 6A shows a normalized SOL gradient plotted as a function of ESD power, $P_{BAT}$, over a range that is a continuum from charging to discharging the ESD, with exemplary target gradient Points A and B, from FIG. 5. FIG. 6C shows a line demonstrating an operating cost as a function of the normalized SOL gradient, wherein the target line, at the target gradient value, corresponds to the Line 90 shown in FIG. 5. Operating costs generally comprise costs associated with fuel and electrical energy consumption associated with a specific operating point of the powertrain system for the vehicle. This graph demonstrates that there is a low operating cost associated with a normalized SOL gradient that is less than the target, i.e. falling below Line 90 of FIG. 5. Conversely, operating cost increases as the normalized SOL gradient increases greater than the target line. FIG. 6B can be constructed using information from FIGS. 6A and 6C, wherein operating cost is plotted as a function of ESD power, $P_{BAT}$, with lines representing costs associated with operating the exemplary system starting at Points A and B plotted, and correlated to analogous operating points shown in FIG. 6A. It is readily demonstrated the relative magnitude of a cost differential associated with the same ESD power, $P_{BAT}$, at different initial starting points. In other words, operating with SOL above the target gradient, i.e. Line 90 of FIG. 5 is generally more costly and less preferred than operating with SOL at or below the target gradient. Thus, the control system can execute an algorithm operative to control the power transmitted from the electrical energy storage device such that the electrical energy storage device generally tracks and converges on the target gradient, preferably avoids SOL in excess of the target gradient, and does not reach end-of-life when the target life objective, e.g. time or distance, is attained.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for operating a hybrid electric powertrain including an electrical energy storage device configured to exchange electrical energy with a hybrid vehicular powertrain including first and second electric machines, each machine operable to impart torque to a two-mode, compound-split electro-mechanical transmission having four fixed gear ratios and two continuously variable operating modes, comprising:

establishing a state-of-life parameter associated with the electrical energy storage device;

providing a present state-of-life of the electrical energy storage device;

establishing a life target for the electrical energy storage device as a predetermined limit in a predetermined metric at a predetermined state-of-life of the electrical energy storage device;

determining a state-of-life gradient with respect to the predetermined metric which converges the state-of-life of the electrical energy storage device to the life target; and operating the electric machines such that the electrical energy storage device state-of-life substantially tracks the state-of-life gradient.

2. The method of claim 1 wherein the predetermined limit in the predetermined metric at the predetermined state-of-life of the electrical energy storage device is associated with an end of service life of the electrical energy storage device.

3. The method as in claim 2 wherein the predetermined metric comprises elapsed service time of the electrical energy storage device.

4. The method of claim 2 wherein the predetermined metric comprises an accumulated vehicle distance traveled.

5. The method of claim 1 wherein the life target for the electrical energy storage device is associated with one of elapsed service time of the electrical energy storage device and an accumulated vehicle distance traveled.

6. The method of claim 5 wherein the life target is normalized with respect to the one of elapsed service time of the electrical energy storage device and the accumulated vehicle distance traveled upon which the life target is based.

7. Method for operating a hybrid electric powertrain including an electrical energy storage device adapted for exchanging electrical energy with a hybrid vehicular powertrain including first and second electric machines, each machine operable to impart torque to a two-mode, compound-split electro-mechanical transmission having four fixed gear ratios and two continuously variable operating modes, comprising:
  establishing a state-of-life parameter associated with the electrical energy storage device;
  providing a state-of-life gradient based on a present state-of-life of the electrical energy storage device and at least one predetermined limit of a predetermined metric associated with the state-of-life; and
  controlling electrical energy storage device current during periods of vehicle activity such that the electrical energy storage device state-of-life substantially tracks the state-of-life gradient.

8. The method of claim 7 wherein controlling the electrical energy storage device current such that electrical energy storage device state-of-life substantially tracks the state-of-life gradient comprises:
  providing a plurality of predicted effects upon the electrical energy storage device state-of-life based on a plurality of potential electrical energy storage device currents during periods of vehicle activity; and
  controlling the electrical energy storage device current during periods of vehicle activity based on the predicted effects and the state-of-life gradient.

9. The method of claim 8 wherein controlling electrical energy storage device current during periods of vehicle activity comprises: operating the electric machines based on the predicted effects and the state-of-life gradient.

10. Method for operating a hybrid electric powertrain including an electrical energy storage device configured to exchange electrical energy with a hybrid vehicular powertrain including first and second electric machines, each machine configured to impart torque to a two-mode, compound-split electro-mechanical transmission having four fixed gear ratios and two continuously variable operating modes, comprising:
  establishing an operating parameter comprising a state-of-life associated with the electrical energy storage device; and
  controlling power transmitted between the electrical energy storage device and the first and second electric machines during periods of vehicle activity such that the state-of-life associated with the electrical energy storage device is less than a predetermined value when a target life objective is attained.

11. The method of claim 10, wherein controlling power transmitted between the electrical energy storage device and the first and second electric machines during periods of vehicle activity such that the state-of-life associated with the electrical energy storage device is less than a predetermined value when the target life objective is attained further comprises:
  calculating a life factor associated with an accumulated time and an accumulated distance of operation of the powertrain;
  determining a target state-of-life gradient associated the life factor, the state-of-life, and the target life objective; and,
  controlling electrical power transmitted between the electrical energy storage device and the powertrain to track the target state-of-life gradient.

12. The method of claim 11, wherein controlling electrical power transmitted between the electrical energy storage device and the powertrain to track the target state-of-life gradient further comprises:
  determining potential changes in the state-of-life for the electrical energy storage device associated with each of an array of potential electrical currents through the electrical energy storage device during periods of vehicle activity; and,
  selecting one of the array of potential electrical currents having a potential change in the state-of-life of the electrical energy storage device that tracks the target state-of-life gradient.

13. The method of claim 12, wherein determining the potential changes in the state-of-life for the electrical energy storage device associated with each of an array of potential electrical currents through the electrical energy storage device during periods of vehicle activity further comprises:
  selecting the array of potential electrical currents through the electrical energy storage device; and,
  determining a corresponding array of changes in the state-of-life for the electrical energy storage device associated with the array of potential electrical currents through the electrical energy storage device; wherein changes in the state-of-life for the electrical energy storage device are associated with a time-based integration of the electrical currents through the electrical energy storage device, depth of discharge of the energy storage device, and, operating temperature of the electrical energy storage device.

14. The method of claim 10, wherein controlling power transmitted between the electrical energy storage device and the electric machines during periods of vehicle activity such that the operating state of the electrical energy storage device is less than a predetermined value further comprises:
  determining the operating state of the electrical energy storage device, comprising:
  monitoring electrical current through the electrical energy storage device;
  monitoring a state-of-charge of the electrical energy storage device;
  monitoring a temperature of the electrical energy storage device during periods of vehicle activity and inactivity; and,
  determining a state-of-life of the electrical energy storage device associated with the electrical energy storage device current, the state-of-charge of the electrical energy storage device, and, the temperature of the electrical energy storage device during periods of vehicle activity and inactivity.

* * * * *